F. W. DERBYSHIRE.
TAIL STOCK.
APPLICATION FILED JUNE 4, 1913.
1,168,063.
Patented Jan. 11, 1916.
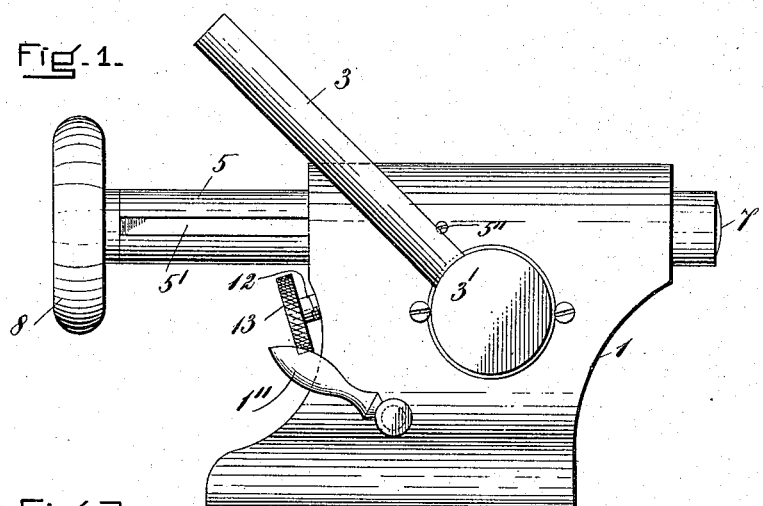
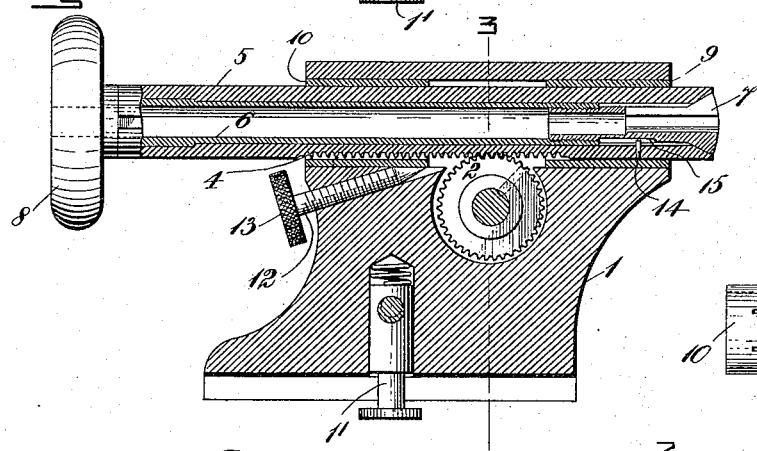
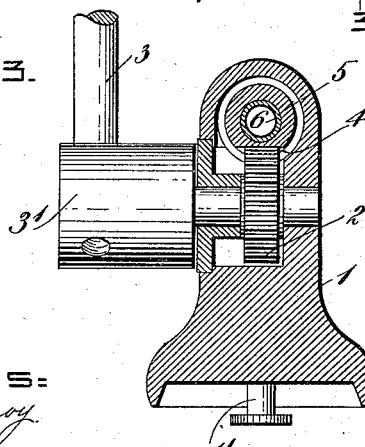
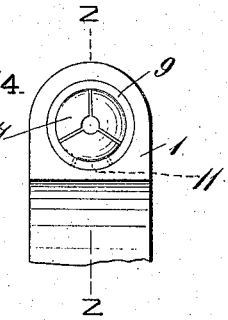
WITNESSES:
Patrick J. Conroy
E. B. Tomlinson
INVENTOR:
Frederick W. Derbyshire
by Browne & Woodworth
attys.

UNITED STATES PATENT OFFICE.

FREDERICK W. DERBYSHIRE, OF WALTHAM, MASSACHUSETTS.

TAIL-STOCK.

1,168,063.

Specification of Letters Patent.

Patented Jan. 11, 1916.

Application filed June 4, 1913. Serial No. 771,636.

*To all whom it may concern:*

Be it known that I, FREDERICK W. DERBYSHIRE, a citizen of the United States, and a resident of Waltham, in the county of Middlesex and State of Massachusetts, have invented a new and useful Improvement in Tail-Stocks, of which the following is a specification.

The present invention relates to tail-stocks for lathes and more especially to lathes of the smaller sizes such as are used by jewelers, and the object of the invention is to improve the construction of such tail-stocks in the manner hereinafter set forth.

My invention will be described in connection with the drawings which accompany and form a part of this specification, in which—

Figure 1 is a side elevation of my improved tail-stock; Fig. 2 is a central longitudinal section; Fig. 3 is a transverse section taken on the line 3—3 of Fig. 2; Fig. 4 is a fragmentary end view, and Fig. 5 is a bottom view of the spindle-locking sleeve hereinafter more fully described.

In the particular drawings selected for more fully disclosing my invention, 1 represents the tail-stock body adjustably secured to the bed-plate by the cam bolt 1' which is actuated by the handle 1'' in the usual manner. Journaled within the tail-stock body is the usual pinion 2 actuated by the lever 3, which is screwed into the hub 3', and the pinion coöperates with the rack 4 cut into the lower portion of the hollow drawing-in spindle 5, so that as the lever 3 rotated about the axis of the pinion, the spindle is reciprocated within the tail-stock. Located within the spindle is a member 6 herein shown as a tube having threaded engagement with the inner end of the hollow wire-chuck 7. The outer end of the tube 6 is provided with a handle 8 for turning the same about the longitudinal axis of the spindle, and inasmuch as rotary motion of the chuck is prevented by the key 14 which passes through the spindle into a key-way 15 in the chuck, the rotation of the tube 6 in one direction will draw the rearwardly beveled edges of the chuck against the correspondingly-beveled outer edges of the spindle and thereby close the chuck-jaws, while rotation of the handle in the opposite direction will cause them to open. Rotation of the drawing-in spindle 5 is prevented by the coöperation of the pin 5'', screwed into the tail-stock, with the longitudinal slot 5' cut into the outer surface of the spindle.

The sleeves 9, 10, which have a driving fit with the bore of the head-stock, afford bearing surfaces for the spindle, and the lower portion of the sleeve 10 is cut longitudinally, as shown in Fig. 5, to form a tongue 11, against which bears the outer end of the screw 12, so that when the head 13 of the screw is turned in one direction, the tongue will bind the spindle and lock it in position, while the turning of said screw in the other direction will unlock the spindle.

It has been found advantageous in practice in some instances to hold a drill, especially a drill of one of the smaller sizes, or a small cutter, in the tail-stock and to rotate the work with respect to the drill or cutter by means of the head-stock, and sometimes it is advantageous to hold the work in the tail-stock and rotate the cutter with respect to the work by means of the head-stock. The member 6 and the wire chuck are both preferably hollow as shown, so that the end of the drill or cutter, or the end of the work, can enter and lie within the spindle, thereby making it feasible to use longer drills or cutters, or operate on a longer piece of work, than if the drawing-in spindle were solid or the chuck provided with a bore extending only part way therethrough. In the case of small cutters, as for example a drill of very small diameter, it has been found that there is much less vibration when the cutter is held stationary in the tail-stock and the work rotated with respect thereto. For this reason it has been customary to bore out a tapered center and solder a drill therein, and as will be obvious the present invention affords means whereby a drill or small cutter may be more conveniently held in the tail-stock than by means of the devices heretofore employed for this purpose.

It will be understood of course that when a cutting tool is held in the wire-chuck 7, the spindle will not be locked by the screw 12, and that the function of the latter is to lock the spindle in adjusted position when the wire-chuck is replaced by an ordinary tapered center.

It will be obvious that various modifications may be made in the particular device shown in the drawings without departing from the principle of my invention as set forth in the claim.

I claim:

The combination with a lathe-stock of a sleeve fixed in said lathe-stock and provided with a tongue, a drawing-in spindle within said sleeve, a screw threaded to said lathe-stock and having its inner end bearing against said tongue, and means whereby said screw may be rotated for forcing said tongue against said spindle.

In testimony whereof, I have hereunto subscribed my name this 3rd day of June, 1913.

FREDERICK W. DERBYSHIRE.

Witnesses:
E. B. TOMLINSON,
GEO. K. WOODWORTH.

Copies of this patent may be obtained for five cents each, by addressing the "Commissioner of Patents, Washington, D. C."